(12) United States Patent
Bergeron et al.

(10) Patent No.: US 11,092,126 B2
(45) Date of Patent: Aug. 17, 2021

(54) COMMON-RAIL FUEL SYSTEM WITH EJECTOR PUMP AND METHOD OF USE THEREOF

(71) Applicant: PRATT & WHITNEY CANADA CORP., Longueuil (CA)

(72) Inventors: Sebastien Bergeron, Chambly (CA); Etienne Plamondon, Candiac (CA); Jean-Gabriel Gauvreau, Contrecoeur (CA); Benjamin Renaud, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 14 days.

(21) Appl. No.: 16/558,847

(22) Filed: Sep. 3, 2019

(65) Prior Publication Data

US 2021/0062772 A1 Mar. 4, 2021

(51) Int. Cl.
| | |
|---|---|
| *F02M 63/02* | (2006.01) |
| *F02B 53/10* | (2006.01) |
| *F02B 61/04* | (2006.01) |
| *F02M 55/02* | (2006.01) |

(52) U.S. Cl.
CPC ......... *F02M 63/0245* (2013.01); *F02B 53/10* (2013.01); *F02B 61/04* (2013.01); *F02M 55/025* (2013.01); *F02M 63/0265* (2013.01)

(58) Field of Classification Search
CPC ............. F02M 37/0052; F02M 37/025; F02M 55/002; F02M 55/025; F02M 63/0225–0265; F02B 53/10; F02B 61/04
See application file for complete search history.

(56) References Cited

U.S. PATENT DOCUMENTS

| | | | | |
|---|---|---|---|---|
| 3,645,094 A | * | 2/1972 | Suggs | F04D 9/06 |
| | | | | 60/39.281 |
| 3,901,025 A | * | 8/1975 | Bryerton | F02C 7/22 |
| | | | | 60/39.094 |
| 4,213,741 A | * | 7/1980 | Rogers | F02C 9/38 |
| | | | | 137/115.03 |
| 4,339,917 A | * | 7/1982 | LaGrone | F02C 7/236 |
| | | | | 137/565.32 |

(Continued)

FOREIGN PATENT DOCUMENTS

| | | | | |
|---|---|---|---|---|
| DE | 102012101293 A1 | * | 8/2013 | ......... F02M 63/0225 |
| DE | 102012204750 | | 9/2013 | |

(Continued)

OTHER PUBLICATIONS

European Search Report issued for Application No. 20193952.7 dated Jan. 25, 2021.

*Primary Examiner* — John M Zaleskas
(74) *Attorney, Agent, or Firm* — Norton Rose Fulbright Canada LLP

(57) ABSTRACT

A method of operating an aircraft engine of an aircraft, the aircraft engine having a common-rail fuel injection system for injecting fuel into a combustion chamber of the aircraft engine, including: pressurizing fuel for circulation through the common-rail injection system; circulating a portion of the pressurized fuel through a motive flow inlet of an ejector pump; and entraining a flow through the ejector pump with the portion of the pressurized fuel circulating through the motive flow inlet.

18 Claims, 4 Drawing Sheets

(56) References Cited

U.S. PATENT DOCUMENTS

| | | | | |
|---|---|---|---|---|
| 4,704,070 A * | 11/1987 | Iseman | F02M 37/20 417/80 |
| 5,454,532 A * | 10/1995 | Whitmire | F04F 5/46 244/134 B |
| 5,692,479 A * | 12/1997 | Ford | F02M 37/0029 123/506 |
| 5,983,869 A * | 11/1999 | Cooke | F02M 55/002 123/514 |
| 6,068,022 A * | 5/2000 | Schultz | F02M 37/025 137/538 |
| 6,205,981 B1 * | 3/2001 | Lorraine | F02M 55/00 123/456 |
| 8,635,991 B2 | 1/2014 | Pursifull | |
| 9,441,597 B2 | 9/2016 | Pursifull | |
| 2003/0041842 A1 * | 3/2003 | Kumagai | F02M 63/0295 123/458 |
| 2003/0111050 A1 * | 6/2003 | Schueler | F02M 37/025 123/446 |
| 2005/0279079 A1 * | 12/2005 | Baryshnikov | F02C 7/236 60/39.094 |
| 2008/0017170 A1 * | 1/2008 | Moroi | F02M 37/0076 123/456 |
| 2009/0050551 A1 * | 2/2009 | Kimisawa | F02M 37/10 210/172.4 |
| 2011/0048376 A1 * | 3/2011 | Song | F02M 37/025 123/445 |
| 2011/0168132 A1 * | 7/2011 | Pursifull | F02M 63/027 123/446 |
| 2011/0168133 A1 * | 7/2011 | Pursifull | F02D 19/0647 123/495 |
| 2011/0253231 A1 * | 10/2011 | Dore | F01D 21/02 137/511 |
| 2011/0290203 A1 * | 12/2011 | Pursifull | F02D 19/0676 123/41.08 |
| 2013/0036738 A1 * | 2/2013 | Pora | F02M 37/025 60/734 |
| 2013/0112174 A1 * | 5/2013 | Krauss | F04C 14/02 123/504 |
| 2013/0133870 A1 * | 5/2013 | Myers | F01P 11/04 165/183 |
| 2014/0020381 A1 * | 1/2014 | Bolduc | F01C 11/008 60/605.1 |
| 2014/0261293 A1 * | 9/2014 | Schulz | F01C 1/22 123/209 |
| 2014/0261294 A1 * | 9/2014 | Thomassin | F02B 19/108 123/209 |
| 2015/0136091 A1 * | 5/2015 | Ryu | F02M 37/025 123/495 |
| 2016/0003199 A1 * | 1/2016 | Kato | F02M 39/005 123/445 |
| 2016/0201629 A1 * | 7/2016 | Kato | F16J 15/004 137/312 |
| 2017/0175639 A1 * | 6/2017 | Shafique | B64D 37/10 |
| 2017/0267341 A1 * | 9/2017 | Thomassin | B64C 21/04 |
| 2017/0291714 A1 * | 10/2017 | Corman | F02M 37/025 |
| 2017/0362974 A1 * | 12/2017 | Schulz | F01M 1/02 |
| 2018/0163678 A1 * | 6/2018 | Kato | F02M 37/0041 |
| 2019/0368449 A1 * | 12/2019 | Klein | F02D 41/123 |
| 2019/0375513 A1 * | 12/2019 | Otradovec | B01D 19/0031 |
| 2020/0232409 A1 * | 7/2020 | Plamondon | F02D 41/3863 |
| 2020/0232431 A1 * | 7/2020 | Plamondon | F01P 3/16 |
| 2020/0232432 A1 * | 7/2020 | Bergeron | F01C 21/06 |

FOREIGN PATENT DOCUMENTS

| | | | | |
|---|---|---|---|---|
| DE | 102012204750 A1 * | 9/2013 | | F02D 41/40 |
| DE | 102016122454 | 6/2017 | | |
| DE | 102018207010 B3 * | 7/2019 | | B60K 15/03504 |
| EP | 3258062 | 12/2017 | | |
| GB | 541821 A * | 12/1941 | | F02M 37/025 |
| GB | 1581978 A * | 12/1980 | | F02M 37/025 |
| JP | 2017120058 A * | 7/2017 | | F02M 37/025 |
| KR | 20110016076 A * | 2/2011 | | F02D 41/40 |
| WO | WO-2016071046 A1 * | 5/2016 | | F02M 63/024 |

* cited by examiner

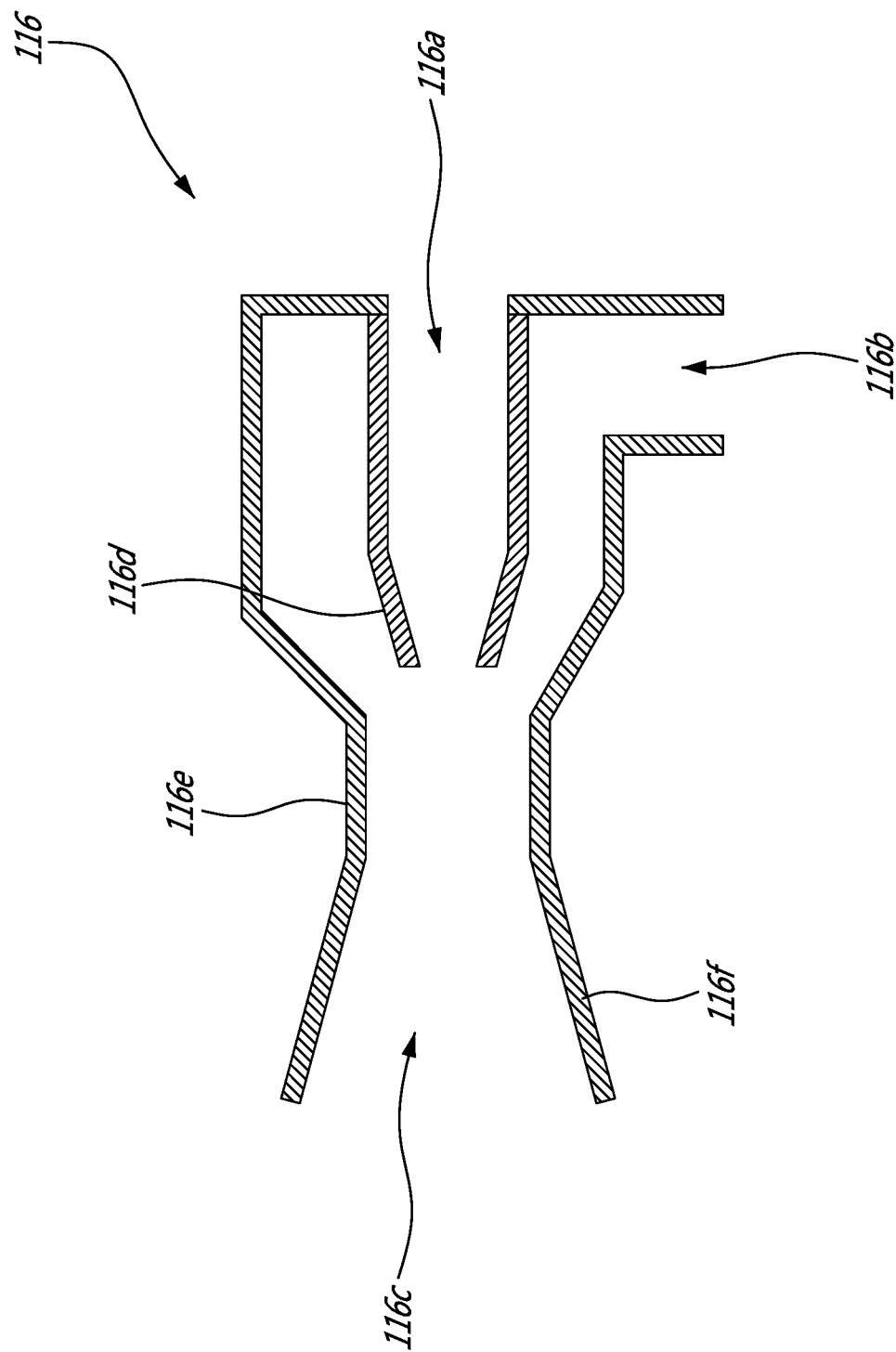

COMMON-RAIL FUEL SYSTEM WITH EJECTOR PUMP AND METHOD OF USE THEREOF

TECHNICAL FIELD

The application relates generally to aircraft engines and, more particularly, to fuel systems used in such aircraft engines.

BACKGROUND

Aircraft engines include at least one combustion chamber into which fuel is provided, typically by a fuel injector. Some fuel injectors, such as common-rail injectors, generate a backflow of fuel. The energy of the backflow is typically wasted, as the fuel backflow is usually returned directly back to the fuel tank. Better and more efficient fuel management in such fuel systems is therefore desirable.

SUMMARY

In one aspect, there is provided a method of operating an aircraft engine of an aircraft, the aircraft engine having a common-rail fuel injection system for injecting fuel into a combustion chamber of the aircraft engine, comprising: pressurizing fuel for circulation through the common-rail injection system; circulating a portion of the pressurized fuel through a motive flow inlet of an ejector pump; and entraining a flow through the ejector pump with the portion of the pressurized fuel circulating through the motive flow inlet.

In another aspect, there is provided a method of supplying fuel to an aircraft engine having a common-rail fuel injection system, comprising: pressurizing fuel to circulate through the common-rail injection system; injecting a portion of the fuel in common-rail injectors of the common-rail injection system thereby generating a backflow of fuel; and entraining fuel to be pressurized from a source of fuel though an ejector pump with the backflow of fuel circulating through a motive flow inlet of the ejector pump.

In yet another aspect, there is provided an aircraft engine comprising: at least one combustion chamber; a fuel pump fluidly connected to a source of fuel; a common-rail injector having an injector inlet fluidly connected to the fuel pump via a fuel conduit, a first injector outlet fluidly connected to the at least one combustion chamber, and a second injector outlet for outputting a backflow of fuel; and an ejector pump having a motive flow inlet fluidly connected to one of the second injector outlet and the fuel conduit upstream of the common-rail injector, an entrained flow inlet for receiving fuel to be suctioned by the ejector pump.

DESCRIPTION OF THE DRAWINGS

Reference is now made to the accompanying figures in which:

FIG. 4 is a schematic cross-sectional view of an ejector pump that may be used with the engine assembly of FIG. 3.

DETAILED DESCRIPTION

Figure 1:
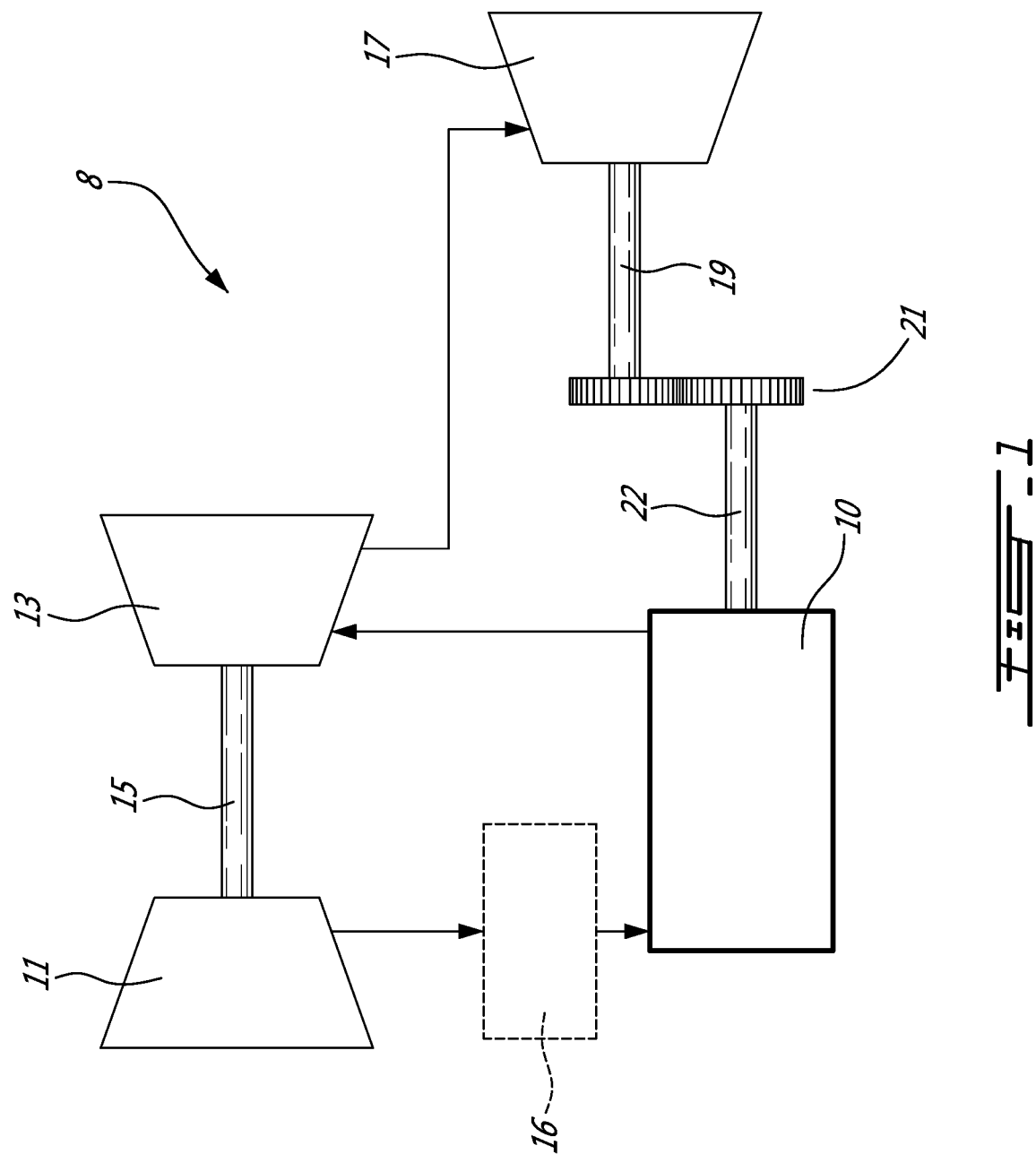
FIG. 1 is a block diagram of a compound engine system.

Referring to FIG. 1, a compound engine system 8 is schematically shown. The system 8 includes a compressor 11 and a turbine 13 which are connected by a shaft 15, and which act as a turbocharger to one or more rotary engines 10. The compressor 11 may be a single-stage or multiple-stage centrifugal device and/or an axial device. A rotary engine 10, or a plurality of rotary engines, receives compressed air from the compressor 11. The air optionally circulates through an intercooler 16 between the compressor 11 and the rotary engine(s) 10.

The exhaust gas exiting the rotary engine 10 is supplied to the compressor turbine 13 and also to a power turbine 17, the turbines 13, 17 being shown here in series, i.e. with the exhaust gas flowing first through one of the two turbines where the pressure is reduced, and then through the other turbine, where the pressure is further reduced. In an alternate embodiment (not shown), the turbines 13, 17 are arranged in parallel, i.e. with the exhaust gas being split and supplied to each turbine at same pressure. In another alternate embodiment, only one turbine is provided.

Energy is extracted from the exhaust gas by the compressor turbine 13 to drive the compressor 11 via the connecting shaft 15, and by the power turbine 17 to drive an output shaft 19. The output shaft 19 may be connected via a gear system 21 to a shaft 22 connected to the rotary engine(s) 10. The combined output on the shafts 19, 22 may be used to provide propulsive power to a vehicle application into which the system 8 is integrated. This power may be delivered through a gearbox (not shown) that conditions the output speed of the shafts 19, 22 to the desired speed on the application. In an alternate embodiment, the two shafts 19, 22 may be used independently to drive separate elements, e.g. a propeller, a helicopter rotor, a load compressor or an electric generator depending whether the system is a turboprop, a turboshaft or an Auxiliary Power Unit (APU).

Although not shown, the system 8 also includes a cooling system, including a circulation system for a coolant to cool the outer body of the rotary engine (e.g. water-ethylene, oil, air), an oil coolant for the internal mechanical parts of the rotary engine, one or more coolant heat exchangers, etc.

The compound engine system 8 may be as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein.

Figure 2:
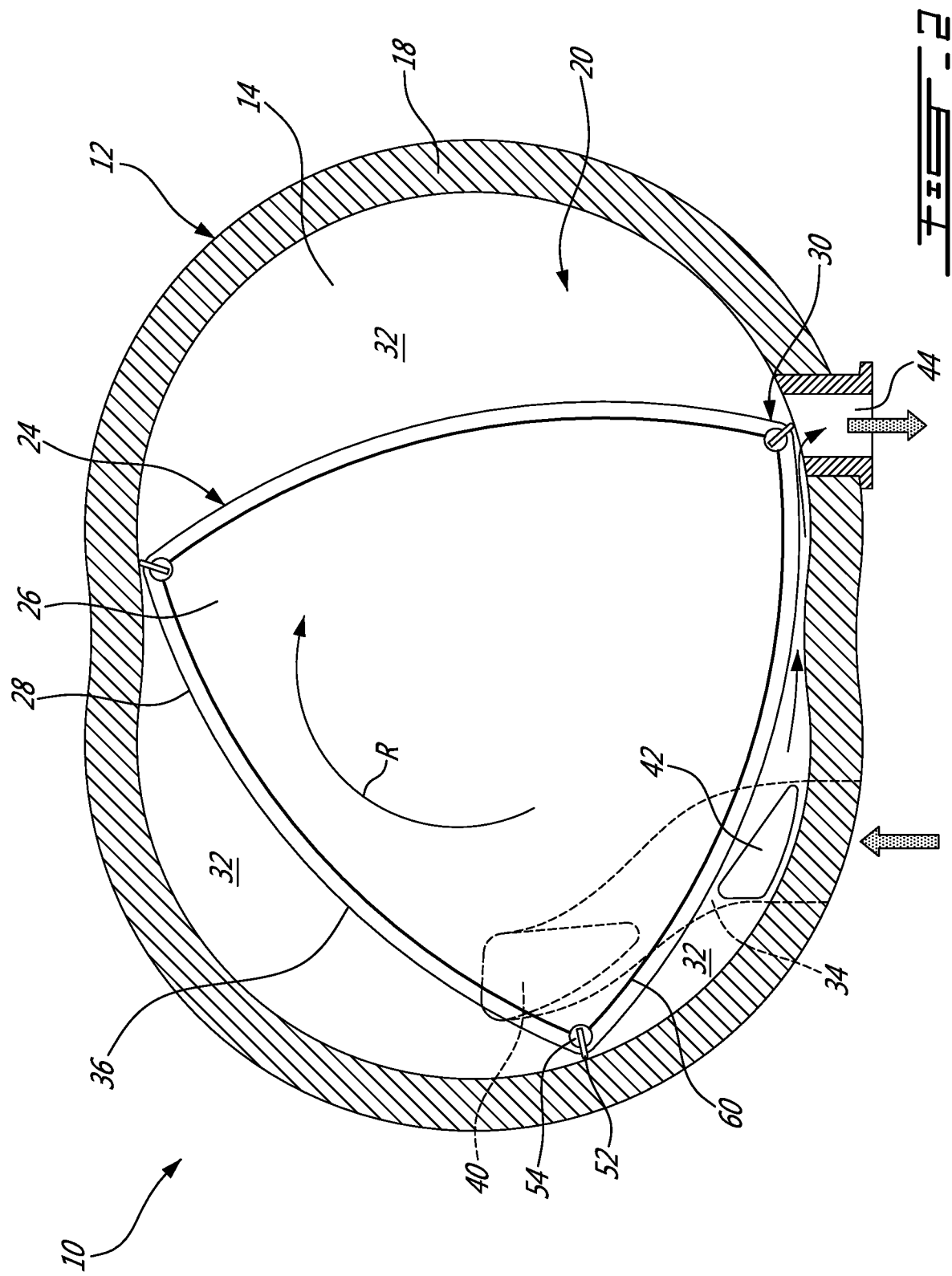
FIG. 2 is a schematic cross-sectional view of a rotary internal combustion engine in accordance with a particular embodiment.

The rotary engine 10 forms the core of the compound cycle engine system 8. Referring to FIG. 2, the rotary internal combustion engine 10, known as a Wankel engine, is schematically shown. The rotary combustion engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 3:
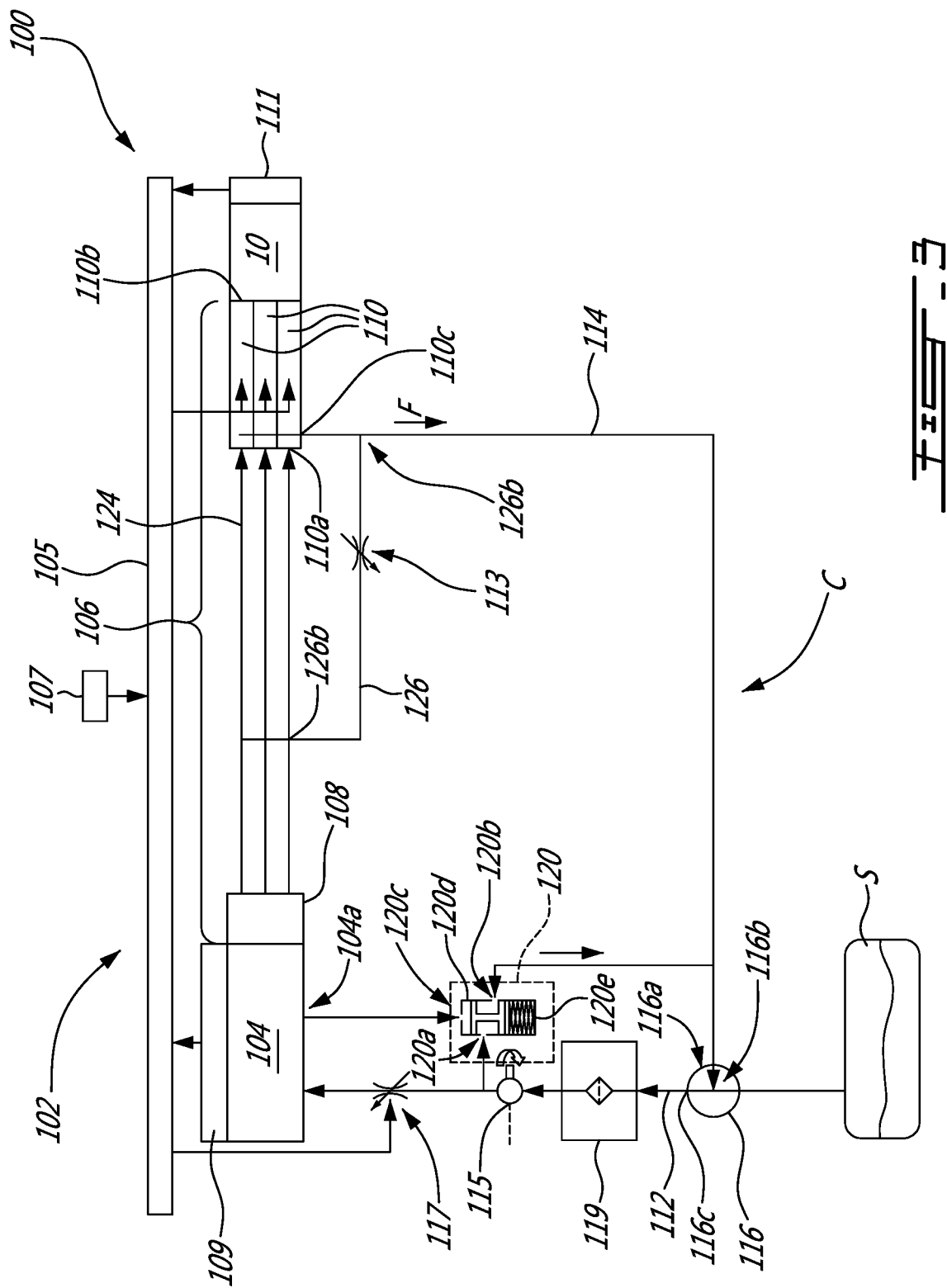
FIG. 3 is a schematic view of an engine assembly in accordance with one embodiment.

Referring to FIG. 3, an engine assembly is generally shown at 100. The engine assembly 100 may incorporate the compound cycle engine system 8 described herein above with reference to FIG. 1 and may include the rotary engine 10 described above with reference to FIG. 2. The engine 10 may however be any combustion engine, such as a gas turbine engine, a piston engine, a rotary engine, and so on. The disclosed engine assembly may also be implemented as a gas turbine engine used as an Auxiliary Power Unit (APU) in an aircraft. Accordingly, the term "combustion engine" as used herein is understood to include all of these types of engines (reciprocating combustion engines such as piston engines, rotating combustion engines such as rotary or Wankel engines, continuous flow engines such as gas turbine engines, etc.), and is therefore defined as any engine having one or more combustion chambers and having a fuel system feeding fuel to the combustion chamber(s). As will be described further below, the fuel system of the present engines uses common rail injection.

The engine assembly 100 includes a fuel injection system 102 for providing fuel to the combustion engine 10 from a fuel source S, which, in the embodiment shown, comprises a fuel tank. As shown, the fuel injection system 102 includes one or more high-pressure pump(s) 104 and a common-rail system 106. The common-rail system 106 includes a common rail 108 and individual injectors, also referred to as common-rail injectors 110. The common-rail 108 is in fluid communication with each of the injectors 110.

In the embodiment shown, the engine assembly 100 includes a controller 105, which may be a Full Authority Digital Engine Control (FADEC). The controller 105 may be operatively connected to a power lever 107, which may be manually operable by a pilot of an aircraft equipped with the disclosed engine assembly 100. The controller 105 communicates with a high pressure fuel sensor 109, which is operatively connected to the high-pressure pump(s) 104 for determining fuel pressure, and with a speed sensor 111, which is operatively connected to the engine 10 for determining a speed of the engine 10. By receiving pressure and speed data from the pressure and fuel sensors 109, 111, the controller 105 controls an amount of fuel to be injected by the injectors 110 so that the engine 10 delivers the power required by the pilot via the power lever 107.

Still referring to FIG. 3, each of the fuel injectors 110 includes an inlet 110a, a first outlet 110b, and a second outlet 110c. The inlet 110a is fluidly connected to the source S of fuel, in the embodiment shown via the high-pressure pump(s) 104 and the common rail 108. The first outlet 110b is fluidly connected to the combustion chamber 32 (FIG. 2) of the internal combustion engine 10. The second outlet 110c is configured for expelling a backflow F of fuel from the injectors 110.

In a particular embodiment, the injector 110 includes housings and pistons movable within the housings from a first position in which the piston blocks the first outlet 110b of the injector 110 to a second position in which the piston is distanced from the first outlet 110b for allowing the fuel from the source of fuel S to be injected in the combustion chamber 32 (FIG. 2). Movement of the piston is induced by a pressure differential created by the high-pressure pumps 104. When the piston moves from the first position to the second position, a portion of the fuel that enters the injector 110 via its inlet 110a is not injected in the combustion chamber 32 and is expelled out of the injector 110 while bypassing the combustion chamber 32. The backflow F corresponds to this portion of the fuel that is expelled via the second outlet 110c of the fuel injector 110.

The temperature and pressure of the fuel increases as a result of its passage through the high-pressure pump(s) 104. In use, the fuel that exits the injector 110 via the second outlet 110c is typically simply redirected toward the source of fuel S. As will be seen herein below, it is herein proposed to use the backflow F of fuel.

The fuel injection system 102 further has a fuel circuit C including a main conduit 112, for suppling the fuel from the source of fuel S to the injector 110, and a return conduit 114 for receiving the backflow F of fuel.

The fuel circuit C may include a fuel pump 115, also referred to as a boost pump, which may be fluidly connected on the main conduit 112 and configured to draw fuel from the fuel source (e.g., fuel tank) S and to direct the drawn fuel to the high-pressure pump(s) 104. A metering valve 117 may be fluidly connected to the main conduit 112 upstream of the high-pressure pumps 104 for controlling a flow rate of fuel entering the high-pressure pumps 104. As shown, the metering valve 117 is operatively connected to the controller 105 for feeding data thereto about a flow rate of fuel entering the high-pressure fuel pumps 104. A fuel filter 119 may be fluidly connected to the main conduit 112 upstream of the high-pressure pump 104. In the embodiment shown, the fuel filter 119 is located upstream of the pump 115 relative to a flow of fuel from the fuel source S to the high-pressure fuel pump(s) 104.

In the embodiment shown, a pressure regulating valve 120 is fluidly connected to the fuel circuit C. The valve 120 has an inlet 120a and an outlet 120b fluidly connectable to the inlet 120a. The valve 120 further has a control inlet 120c whose function is described below.

The valve 120 has a member 120d movable between a close position (as shown) and an open position (not shown). In the close position, a flow of fuel from the main fuel conduit 112 to the return conduit 114 is permitted. The inlet 120a of the valve 120 is fluidly connected to the outlet 120b of the valve 120 in the open position of the member 120d. In the embodiment shown, the member 120d is biased in the close position using a biasing member 120e, which may be a spring.

In the embodiment shown, the high-pressure pump(s) 104 have a control outlet 104a fluidly connected to the control inlet 120c of the pressure regulating valve 120. The pressure of the fuel entering the high-pressure pumps 104 from the fuel source S is preferably within a given range. If the pressure of the fuel entering the high-pressure pump(s) 104 is above a given pressure threshold, a pressure at the control outlet 104a increases and pushes the valve 120 from the close position to the open position thereby allowing fuel to flow from the main fuel conduit 112 to the return conduit 114. In other words, the pressure regulating valve 120 provides an escape route for excess fuel that would otherwise increase inlet fuel pressure of the high-pressure pump(s) 104 above the given pressure threshold.

In the embodiment shown, the high-pressure pump(s) 104 is fluidly connected to the injectors 110 via fuel conduits 124. Each of the injectors 110 may have its inlet 110a fluidly connected to the high-pressure pump 104 via a respective one of the fuel conduits 124. In the depicted embodiment, a bypass conduit 126 is fluidly connected to the fuel conduits 124. The bypass conduit 126 may have a plurality of upstream connection points 126a each being fluidly connected to a respective one of the fuel conduits 124. The bypass conduit 126 has a downstream connection point 126b that may be connected to the return conduit 114. In the embodiment shown, the downstream connection point 126b of the bypass conduit 126 is fluidly connected to the return conduit 114 downstream of the second outlets 110c of the injectors 110 relative to a direction of the backflow F circulating in the return conduit 114.

The fuel circulating in the fuel conduits 124 between the high pressure pump 104 and the injectors 110 is at high pressure (e.g., 500 bars) and at high temperature as it has been compressed by the high pressure pump(s) 104.

In some cases, it might be advantageous to leverage the backflow of fuel F. Referring also to FIG. 4, the engine assembly 100 includes an ejector pump 116. The ejector pump 116 may be located upstream of the pump 115 and upstream of the filter 119. Other configurations are contemplated. For instance, the ejector pump 116 may be located within the fuel tank. The ejector pump 116 has a motive flow inlet 116a, an entrained flow inlet 116b and an outlet 116c. The ejector pump 116 may include a converging section 116d for accelerating the fuel received through the motive flow inlet 116a.

The motive flow inlet 116a of the ejector pump 116 may be connected to the second injector outlets 110c of the common-rail injectors 110, to the fuel conduits 124 connecting the pump 104 to the common-rail injectors 110, or to both of the second injector outlets 110c and the fuel conduits 124.

In the embodiment shown, the motive flow inlet 116a is connected to the second injector outlets 110c of the common-rail injectors 110 and selectively connected to the fuel conduits 124 when it is required to increase a flow rate of fuel injected to the motive flow inlet 116a. In the depicted embodiment, the motive flow inlet 116a may be fluidly connected to the fuel conduits 124 via the bypass conduit 126 and via the return conduit 114. Other configurations are contemplated without departing from the scope of the present disclosure.

The ejector pump 116 receives the backflow F of fuel and/or a flow of fuel from the fuel lines 126 fluidly connecting the high-pressure pump 104 to the common-rail injectors 110 and injects said flow through a conduit 116e. The conduit 116e is fluidly connected to the motive flow inlet 116a, to the entrained flow inlet 116b, and to the outlet 116c. Injection of the fuel from the motive flow inlet 116a into the conduit 116e creates a depression around a stream or jet of the fuel injected through the inlet 116a. This depression has a suctioning effect that draws a flow of fuel through the entrained flow inlet 116b. In other words, the depression created by the injection of the fuel through the motive flow inlet 116a entrains a secondary flow via the entrained flow inlet 116b. The outlet 116c of the ejector pump 116, which is defined by the conduit 116e and which may define a diverging section 116f, outputs a flow resulting from a combination of the motive flow received via the inlet 116a and the entrained flow received via the entrained flow inlet 116b. Consequently, the jet pump 116 is able to pump a flow of fuel using another flow of fuel from another source. In a particular embodiment, the divergent section 116f transfers kinetic energy of the fuel to potential energy. In a particular embodiment, the disclosed system takes advantage of waste energy coming out of lines 110c by bringing it as a motive flow to increase or improve suction lift at the engine inlet. Using this usually wasted energy may allow to avoid using an oversized pump to draw the fuel from the fuel tank, to reduce the complexity of the system, and to completely operate the system without the pump to meet suction lift requirements at engine inlet.

The motive flow created by the backflow of fuel F and/or by the fuel drawn from the fuel conduits 124 may be used as a motive flow source to the aircraft equipped with the disclosed engine assembly 100. For instance, the motive flow source may be used to suctioned fuel from a fuel tank, to increase a flow rate of fuel through a given fuel conduit, to displace fuel from a given fuel tank to another, and any other suitable applications.

In the present embodiment, a flow control device 113 is fluidly connected to the bypass conduit 126 between the upstream and downstream connection points 126a, 126b. The flow control device 113 may be a variable control orifice and may be used to vary a flow rate of the fuel circulating within the bypass conduit 126. A size of the orifice of the variable control orifice may be controlled manually and/or electronically to control a flow rate in the bypass conduit 126. The flow control device 113 may close fluid communication between the fuel conduits 124 and the ejector 116 via the bypass conduit 126.

In a particular embodiment, the disclosed fuel system allows to use the energy of the return flow coming out of the common rail injectors or directly from the common rail fuel lines to drive a motive flow within an ejector pump. This might allow to take advantage of the waste energy from the common rail system to create a suction effect within the low pressure fuel system or directly from the fuel tank using a motive flow. This concept might be applicable for all engine applications such as turboshaft, turboprop, turbofan and APU using common rail technology.

In a particular embodiment, the disclosed fuel system takes advantage of the waste energy coming out of the common rail injectors; allow the possibility to replace the aircraft fuel tank boost pump by a simple motive flow to fulfill the suction lift; and is a low complexity system, which may be lighter and less expensive than boost pumps.

For operating the aircraft engine, the fuel is pressurized for circulation through the common-rail injection system 102; a portion of the pressurized fuel is circulated through the motive flow inlet 116a of the ejector pump 116; and a flow is entrained through the ejector pump 116 with the portion of the pressurized fuel circulating through the motive flow inlet 116a.

Herein, the portion of the pressurized fuel is the backflow of fuel F from the common-rail injector 110 of the common-rail fuel injection system 102. The backflow of fuel F is circulated through the motive flow inlet 116a of the ejector pump 116. In the embodiment shown, the portion of the pressurized fuel is diverted from at least one fuel conduit 124 to the ejector pump; the at least fuel conduit 124 connecting the high-pressure pump 104 to the common-rail injector 110 of the common-rail injection system 102.

In the embodiment shown, fuel is diverted from at least one fuel conduit 124 and the flow is entrained with both of the backflow of fuel F and the diverted fuel. In the depicted embodiment, the ejector pump 116 is fluidly connected to the source of fuel S, fuel from the source of fuel is entrained through the ejector pump 116 using the portion of the pressurized fuel.

In the embodiment shown, a flow rate of the diverted portion of the pressurized fuel is regulated. The regulation of the flow rate may be achieved by constricting the flow of the diverted portion of the pressurized fuel. Herein, entraining the flow through the ejector pump 116 with the portion of the pressurized fuel includes entraining fuel directly from the fuel tank S.

In the embodiment shown, entraining the flow through the ejector pump 116 with the portion of the pressurized fuel includes suctioning the fuel through the main fuel conduit 112 that fluidly connects the source of fuel S to the high-pressure pump 104.

For supplying fuel to the aircraft engine having the common-rail fuel injection system 102, fuel is pressurized to circulate through the common-rail injection system 102; a portion of the fuel is injected in the common-rail injectors 110 of the common-rail injection system 102 thereby generating the backflow of fuel F; and fuel to be pressurized is entrained from the source of fuel S though the ejector pump 116 with the backflow of fuel F circulating through the motive flow inlet 116a of the ejector pump 116.

In some cases, fuel is diverted from the fuel conduits 124 and the fuel is entrained with both of the backflow of fuel F and the diverted fuel; the fuel conduits 124 connecting the high-pressure pump 104 to the common-rail injectors 110 of the common-rail injection system 102.

In the embodiment shown, a flow rate of the diverted fuel is regulated. The flow rate may be regulated by constricting a flow of the diverted fuel. In the embodiment shown, entraining the fuel from the source of fuel S through the ejector pump 116 includes entraining the fuel directly from the fuel tank. In the illustrated embodiment, entraining the fuel from the source of fuel S through the ejector pump 116 includes suctioning the fuel through the main fuel conduit 112 fluidly connecting the source of fuel S to the high-pressure pump 104.

Embodiments disclosed herein include:

A. A method of operating an aircraft engine of an aircraft, the aircraft engine having a common-rail fuel injection system for injecting fuel into a combustion chamber of the aircraft engine, comprising: pressurizing fuel for circulation through the common-rail injection system; circulating a portion of the pressurized fuel through a motive flow inlet of an ejector pump; and entraining a flow through the ejector pump with the portion of the pressurized fuel circulating through the motive flow inlet.

B. A method of supplying fuel to an aircraft engine having a common-rail fuel injection system, comprising: pressurizing fuel to circulate through the common-rail injection system; injecting a portion of the fuel in common-rail injectors of the common-rail injection system thereby generating a backflow of fuel; and entraining fuel to be pressurized from a source of fuel though an ejector pump with the backflow of fuel circulating through a motive flow inlet of the ejector pump.

Embodiments A and B may include any of the following elements, in any combinations:

Element 1: the portion of the pressurized fuel is a backflow of fuel from at least one common-rail injector of the common-rail fuel injection system, the method including circulating the backflow of fuel through the motive flow inlet of the ejector pump. Element 2: diverting the portion of the pressurized fuel from at least one fuel conduit to the ejector pump, the at least fuel conduit connecting a high-pressure pump to at least one common-rail injector of the common-rail injection system. Element 3: diverting fuel from at least one fuel conduit and entraining the flow with both of the backflow of fuel and the diverted fuel, the at least fuel conduit connecting a high-pressure pump to at least one common-rail injector of the common-rail injection system. Element 4: the ejector pump is fluidly connected to a source of fuel, the method comprising entraining fuel from the source of fuel through the ejector pump using the portion of the pressurized fuel. Element 5: regulating a flow rate of the diverted portion of the pressurized fuel. Element 6: regulating the flow rate includes constricting a flow of the diverted portion of the pressurized fuel. Element 7: entraining the flow through the ejector pump with the portion of the pressurized fuel includes entraining fuel directly from a fuel tank. Element 8: entraining the flow through the ejector pump with the portion of the pressurized fuel includes suctioning the fuel through a main fuel conduit fluidly connecting the source of fuel to a high-pressure pump.

C. An aircraft engine comprising: at least one combustion chamber; a fuel pump fluidly connected to a source of fuel; a common-rail injector having an injector inlet fluidly connected to the fuel pump via a fuel conduit, a first injector outlet fluidly connected to the at least one combustion chamber, and a second injector outlet for outputting a backflow of fuel; and an ejector pump having a motive flow inlet fluidly connected to one of the second injector outlet and the fuel conduit upstream of the common-rail injector, an entrained flow inlet for receiving fuel to be suctioned by the ejector pump.

Embodiment C may include any of the following elements, in any combinations:

Element 9: the motive flow inlet is fluidly connected to both of the second injector outlet and the fuel conduit. Element 10: the motive flow inlet is fluidly connected to the fuel conduit via a bypass conduit, a flow control device being fluidly connected to the bypass conduit. Element 11: the source of fuel is a fuel tank, the ejector pump located within the fuel tank. Element 12: a main fuel conduit fluidly connecting the source of fuel to the fuel pump, and a boost pump fluidly connected to the main fuel conduit, the ejector pump being connected to the main fuel conduit upstream of the boost pump.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of operating an aircraft engine of an aircraft, the aircraft engine having a common-rail fuel injection system for injecting fuel into a combustion chamber of the aircraft engine, comprising:
pressurizing fuel with a high-pressure pump for flowing through the common-rail fuel injection system;
diverting a portion of the pressurized fuel flowing within at least one fuel conduit connecting the high-pressure pump to at least one common-rail injector into a bypass conduit, and flowing the diverted portion of the pressurized fuel from the bypass conduit to a motive flow inlet of an ejector pump, the bypass conduit connected to the at least one fuel conduit at a connection point located downstream of a common-rail of the common-rail fuel injection system and upstream of the at least one common-rail injector;
injecting a remainder of the pressurized fuel into the at least one common-rail injector thereby generating a backflow of fuel; and
entraining a flow through the ejector pump with both of the diverted portion of the pressurized fuel and the backflow of fuel both flowing through the motive flow inlet.

2. The method of claim 1, comprising controlling an amount of fuel injected by the at least one common-rail injector as a function of a pressure in the high-pressure pump and a speed of the aircraft engine.

3. The method of claim 1, wherein the ejector pump is fluidly connected to a source of fuel, the method comprising entraining fuel from the source of fuel through the ejector pump using both of the portion of the pressurized fuel and the backflow of fuel.

4. The method of claim 1, further comprising regulating a flow rate of the diverted portion of the pressurized fuel.

5. The method of claim 4, wherein regulating the flow rate includes constricting a flow of the diverted portion of the pressurized fuel.

6. The method of claim 1, wherein the entraining of the flow through the ejector pump with both of the portion of the pressurized fuel and the backflow of fuel includes entraining fuel directly from a fuel tank.

7. The method of claim 1, wherein the entraining of the flow through the ejector pump with both of the portion of the pressurized fuel and the backflow of fuel includes suctioning the fuel through a main fuel conduit fluidly connecting a source of fuel to the high-pressure pump.

8. A method of supplying fuel to an aircraft engine having a common-rail fuel injection system, comprising:
pressurizing fuel with a high-pressure pump to flow through the common-rail fuel injection system;
injecting a portion of the pressurized fuel in at least one common-rail injector of the common-rail fuel injection system thereby generating a backflow of fuel;
entraining fuel to be pressurized from a source of fuel though an ejector pump with the backflow of fuel flowing through a motive flow inlet of the ejector pump;
diverting fuel from at least one fuel conduit connecting the high-pressure pump to the at least one common-rail injector, the diverting of the fuel including diverting the fuel via a bypass conduit connected to the at least one fuel conduit at a connection point located downstream of a common-rail of the common-rail fuel injection system and upstream of the at least one common-rail injector; and
increasing a flow rate through the ejector pump by further injecting the diverted fuel into the motive flow inlet of the ejector pump.

9. The method of claim 8, further comprising regulating a flow rate of the diverted fuel.

10. The method of claim 9, wherein regulating the flow rate includes constricting a flow of the diverted fuel.

11. The method of claim 8, wherein entraining the fuel from the source of fuel through the ejector pump includes entraining the fuel directly from a fuel tank.

12. The method of claim 8, wherein entraining the fuel from the source of fuel through the ejector pump includes suctioning the fuel through a main fuel conduit fluidly connecting the source of fuel to the high-pressure pump.

13. The method of claim 8, comprising controlling an amount of fuel injected by the at least one common-rail injector as a function of a pressure in the high-pressure pump and a speed of the aircraft engine.

14. An aircraft engine comprising: at least one combustion chamber; a common-rail fuel injection system having a common-rail fluidly connected to a source of fuel;
at least one common-rail injector each having a respective injector inlet fluidly connected to the common-rail via a respective fuel conduit, a respective first injector outlet fluidly connected to the at least one combustion chamber, and a respective second injector outlet for outputting a backflow of fuel; a bypass conduit stemming from the respective fuel conduit between the common-rail of the common-rail fuel injection system and the at least one common-rail injector; and an ejector pump having a motive flow inlet fluidly connected to both of the respective second injector outlet and the bypass conduit, and an entrained flow inlet for receiving fuel to be suctioned by the ejector pump.

15. The aircraft engine of claim 14, comprising a flow control device being fluidly connected to the bypass conduit, the flow control device having an orifice, a size of the orifice being variable to vary a flow of fuel within the bypass conduit.

16. The aircraft engine of claim 14, wherein the source of fuel is a fuel tank, the ejector pump located within the fuel tank.

17. The aircraft engine of claim 14, further comprising a main fuel conduit fluidly connecting the source of fuel to the common-rail, and a boost pump fluidly connected to the main fuel conduit, the ejector pump being connected to the main fuel conduit upstream of the boost pump.

18. The aircraft engine of claim 14, comprising a controller operatively connected to the at least one common-rail injector and to a high-pressure-fuel sensor operatively connected to the high-pressure pump for controlling an amount of fuel to be injected by the least one common-rail injector.

* * * * *